United States Patent [19]

Forbes et al.

[11] Patent Number: 5,283,469
[45] Date of Patent: Feb. 1, 1994

[54] IMPACT START ASSIST FOR AN ELECTRIC MOTOR

[75] Inventors: Franklin L. Forbes, LaOtto, Ind.; Donald W. Jones, Burnt Hills, N.Y.

[73] Assignee: General Electric Company, Fort Wayne, Ind.

[21] Appl. No.: 922,170

[22] Filed: Jul. 29, 1992

[51] Int. Cl.⁵ ............................................. H02K 7/10
[52] U.S. Cl. ................................. 290/1 C; 290/1 R; 290/38 R; 290/48; 310/74; 310/75 R
[58] Field of Search .............. 290/38 R, 48, 1 R, 1 C; 310/74, 75 R, 75 A, 75 D

[56] References Cited

U.S. PATENT DOCUMENTS

| | | | |
|---|---|---|---|
| 1,756,689 | 4/1930 | Jenkins | 310/74 |
| 2,810,085 | 10/1957 | Akeley | 310/162 |
| 3,102,966 | 9/1963 | Hansen | 310/261 |
| 3,153,159 | 10/1964 | Lord | 310/83 |
| 3,226,579 | 12/1965 | Bygdnes | 310/75 R |
| 3,277,669 | 10/1966 | Woolley | 310/75 R |
| 3,387,153 | 6/1968 | Grad | 310/162 |
| 3,521,097 | 7/1970 | Trinter | 310/162 |
| 3,538,360 | 11/1970 | Ludemann et al. | 310/46 |
| 3,737,987 | 6/1973 | Bednarski | 310/261 |
| 3,737,988 | 6/1973 | Bednarski | 310/261 |
| 3,891,879 | 6/1975 | Yamada et al. | 310/261 |
| 4,035,676 | 7/1977 | Adair | 310/42 |
| 4,117,357 | 9/1978 | Baumann | 310/261 |
| 4,305,304 | 12/1981 | Jessup et al. | 74/5.12 |
| 4,412,831 | 11/1983 | Avery et al. | 494/46 |
| 4,433,260 | 2/1984 | Weisbord et al. | 310/156 |
| 4,471,248 | 9/1984 | Smetana | 310/261 |
| 4,472,650 | 9/1984 | Advolotkin et al. | 310/156 |
| 4,488,075 | 12/1984 | DeCesare | 310/156 |
| 4,709,586 | 12/1987 | Moutardier | 74/5.12 |
| 4,841,186 | 6/1989 | Feigel et al. | 310/156 |

FOREIGN PATENT DOCUMENTS

| | | |
|---|---|---|
| 0095572 | 12/1983 | European Pat. Off. . |
| 56-125942 | 10/1981 | Japan . |
| 59-86444 | 5/1984 | Japan . |
| 59-204454 | 11/1984 | Japan .................. 310/261 |

Primary Examiner—A. D. Pellinen
Assistant Examiner—Robert Lloyd Hoover
Attorney, Agent, or Firm—Ralph E. Krisher, Jr.

[57] ABSTRACT

An impact start assist device for an electric motor comprises a driven member coupled to a load and a drive member coupled to the motor and to the driven member. The driven member and the drive member are rotatable, relative to each other, through at least a portion of a revolution. The device further comprises an arrangement for providing a substantially instantaneous transfer of angular momentum from the drive member to the driven member after relative rotation of the members through at least the portion of the revolution. A locking arrangement is provided for locking the drive member and the driven member together at high rotational speeds. At least a portion of the locking arrangement is centrifugally actuated, and a spring is provided to disengage the locking mechanism at low speeds, or at rest. A spring arrangement is also provided to position the drive member and driven member in predetermined angular positions relative to each other when the drive and driven members slow to a predetermined low rotational speed, or to a stop. In one embodiment, the arrangement for instantaneously transferring momentum from the drive member to the driven member comprises a hammer surface and an anvil surface on the respective members which impact one another after the members have rotated through at least a portion of a revolution. The device may be constructed as a coupler to be situated between a motor and a load, integrally constructed as part of the motor or the load, or integrally designed into the rotor of the motor.

26 Claims, 2 Drawing Sheets

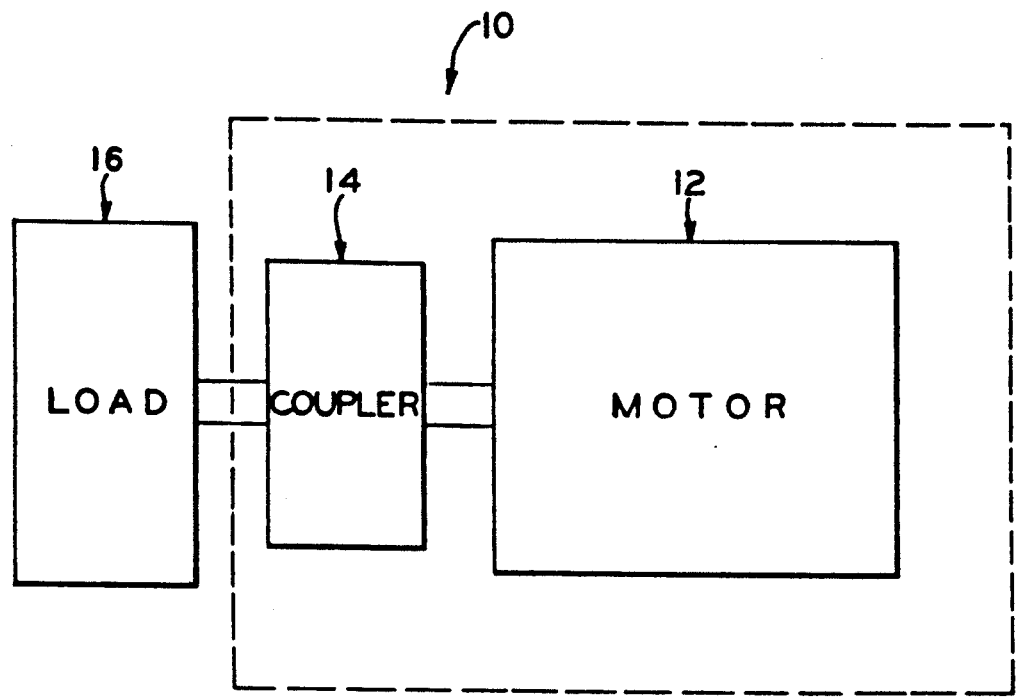
FIG_1
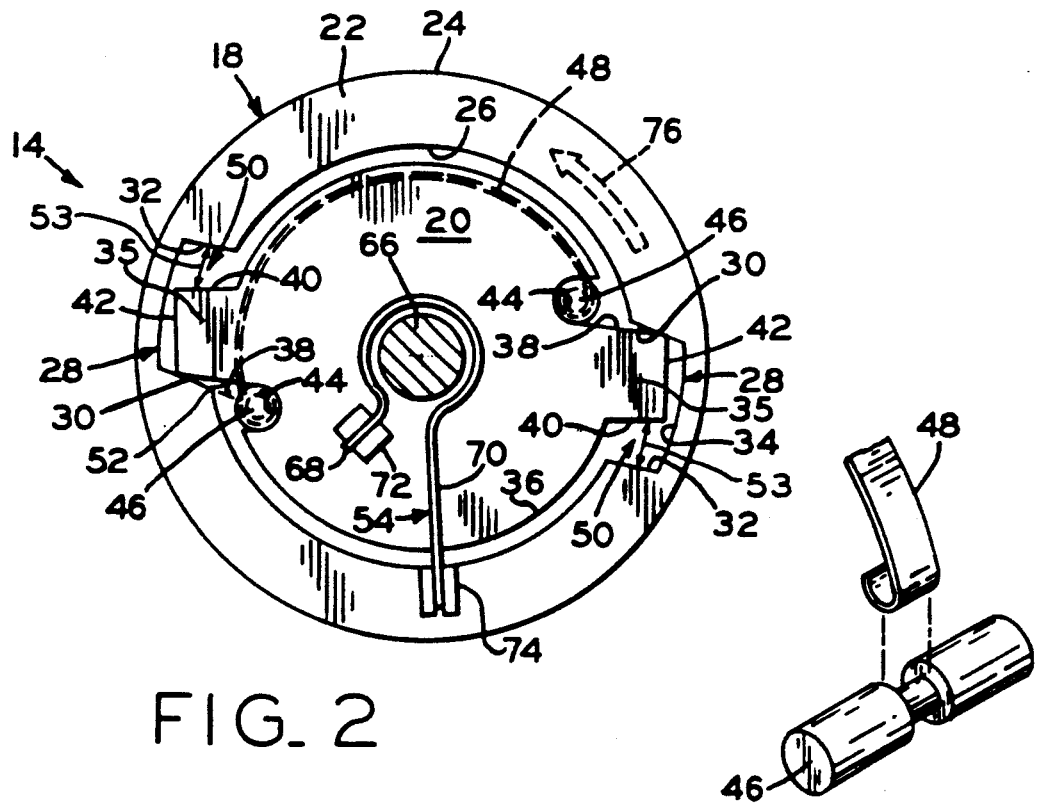
FIG_2
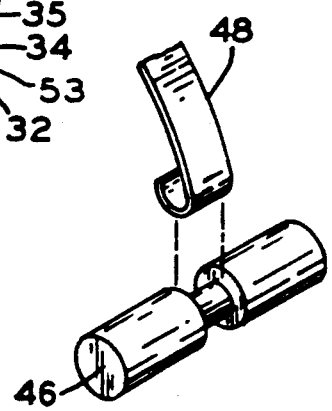
FIG_3

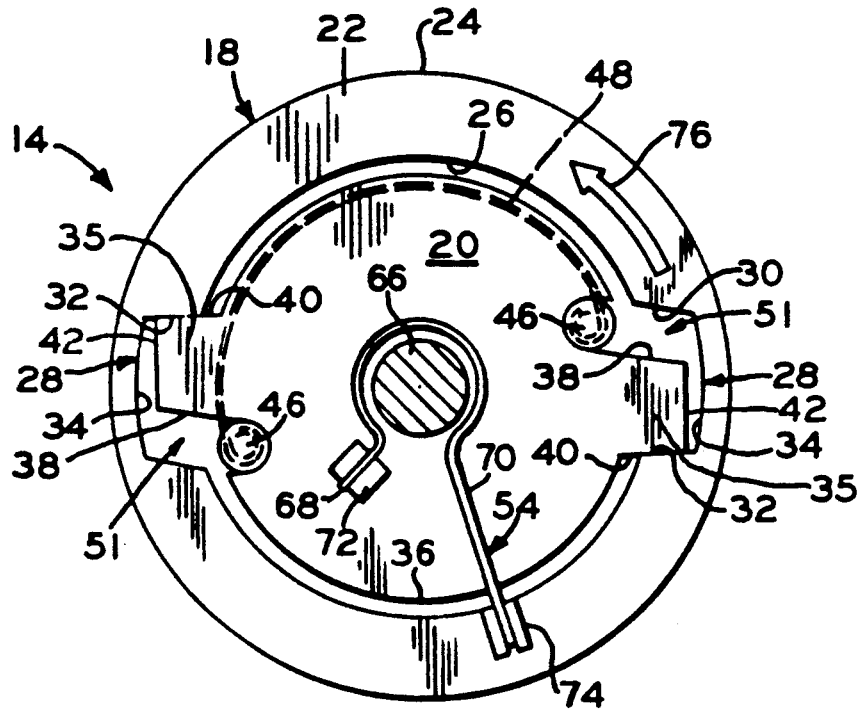
FIG_4
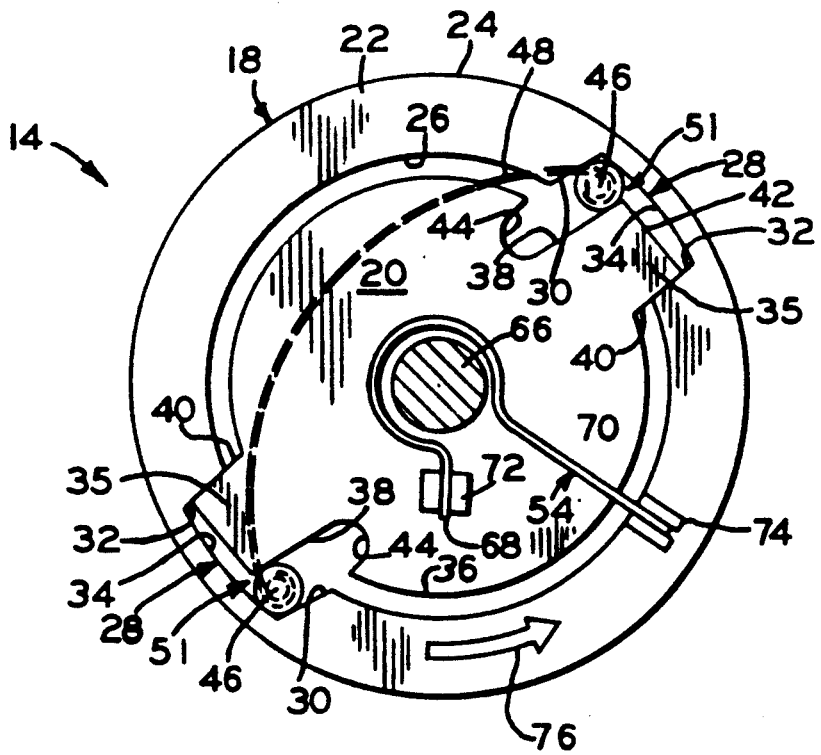
FIG_5

IMPACT START ASSIST FOR AN ELECTRIC MOTOR

BACKGROUND AND SUMMARY OF THE INVENTION

This invention relates to a start assist device for use with an electric motor having low starting torque, and particularly to a device for transferring angular momentum from a motor driven element to an element coupled to a load. More particularly, the invention relates to a device which provides substantially instantaneous transfer of momentum from the motor driven element to the element coupled to the load by means of an impact between respective surfaces of the elements.

Some electric motors, and particularly many types of single phase induction motors, develop inherently low starting torque, as compared to the running, or load torque. In some applications, unusually high starting torque requirements may exist continuously by design, or intermittently due to variations in operating conditions or mechanical malfunctions. In the latter case, unanticipated torque demands may cause a motor to be unable to start.

Conventional dishwashers typically rely on a sliding seal (e.g., carbon-ceramic surfaces) in the bottom of the dishwasher housing where the drive shaft penetrates the wall. Prolonged periods during which a dishwasher is not used may result in "sticking" of this seal due to contamination by detergents or water or other corrosion processes. The "stuck" seal represents an additional frictional barrier to starting the dishwasher that a low torque motor is sometimes unable to overcome, resulting in the need for a service call or other repair efforts. Thus, a need exists for a device which will provide an effective increase in the starting torque characteristic of a motor, such as a single phase induction motor of the type used to power an appliance such as a dishwasher, so as to allow the motor to start and function normally in the face of unanticipated high starting torque demands.

Start assist devices for use with electric motors are known. See, for example, U.S. Pat. No. 3,521,097 to Trinter; U.S. Pat. No. 3,153,159 to Lord; U.S. Pat. No. 4,305,304 to Jessup et al.; and U.S. Pat. No. 4,709,586 to Moutardier.

Conventional start assist devices generally consist of one or more springs coupled to a driving member and a driven member. The driving member is accelerated by the motor, thereby applying tension to the spring. In reacting to the applied tension, the spring tends to drag the driven member up to speed, providing for increased starting torque through a gradual acceleration of the driven member. The spring absorbs some of the energy meant to be imparted to the driven member to bring it up to speed, with a resultant decrease in the overall efficiency of the device. Furthermore, the gradual transfer of energy from the driving member to the driven member may not be adequate or appropriate in all situations, including the "stuck" seal situation referred to above.

A device that provides a substantially instantaneous transfer of energy from the driving member to the driven member would overcome these liabilities. Utilizing impact for the transfer of energy would take advantage of the relatively high running speed and associated angular momentum of the driving member to provide a substantially instantaneous transfer of energy to the driven member for improved starting assist. At the same time, use of an impact start assist device would avoid the use of springs and thereby provide an improved starting assist without the energy losses and other problems inherent in the arrangements which use springs. Thus, a device that provides for a transfer of energy from a driving member to a driven member by utilizing impact would represent an improvement over conventional start assist devices. An object of the present invention is to provide such an impact start assist device for use with electric motors.

According to the present invention, an impact start assist device for use in an electric motor comprises a driven member coupled to a load and a drive member coupled to the motor and to the driven member. The driven member and the drive member are rotatable, relative to each other, through at least a portion of a revolution. The device further comprises means for providing a substantially instantaneous transfer of angular momentum from the drive member to the driven member after relative rotation of the members through at least said portion of a revolution.

In one embodiment, the impact start assist device further comprises means for locking the drive member and the driven member together at high rotational speeds. Means is also provided for unlocking the drive member and the driven member at low rotational speeds, and at rest.

Illustratively, the means for providing an instantaneous transfer of angular momentum includes at least one anvil surface formed on the driven member and at least one hammer surface formed on the drive member. The hammer surface is positioned to impact the anvil formed on the driven member after the drive member has rotated through at least a portion of a revolution relative to the driven member.

The locking means illustratively includes at least one sprag that moves from a rest position to a wedged position between the hammer surface and the anvil surface at a first relatively high rotational speed. The locking means further includes a resilient element, such as a spring, coupled to the sprag to move the sprag from the wedged position to a rest position at a second relatively low rotational speed. The device also includes a resilient element coupled to the drive member and the driven member to return the members to predetermined angular positions relative to each other at a third relatively low rotational speed.

The impact start assist device of the present invention may be constructed as a coupling device which is used to connect a standard electric motor to a load. Alternatively, the impact start assist device may be integrally constructed with an electric motor, or the rotor of an electric motor may be constructed of two, relatively rotatable components which comprise driving and driven members and which function to provide the substantially instantaneous transfer of momentum in the manner described.

By providing a drive member which is initially free of the load, the present invention allows the drive member to quickly develop a high angular momentum. By rotatably coupling the drive member to the driven member and providing for a substantially instantaneous transfer of the drive member momentum to the driven member, the present invention provides a considerable improvement over conventional start assist devices.

Additional objects, features, and advantages of the invention will become apparent to those skilled in the art upon consideration of the following detailed description of preferred embodiments exemplifying the best mode of carrying out the invention as previously perceived.

BRIEF DESCRIPTION OF THE DRAWINGS

FIG. 1 is a schematic view showing an impact start assist device constructed in accordance with the present invention acting as a coupler between a motor and a load;

FIG. 2 is a transverse section of an embodiment of the present invention coupled to a motor (not shown) that is at rest;

FIG. 3 illustratively shows a sprag and an end portion of a centrifugal control spring and representative means for coupling a centrifugal control spring to the sprag;

FIG. 4 shows the same transverse section of FIG. 2 shortly after the motor (not shown) is energized and at approximately the point of initial impact between the drive member and driven member wherein the sprags are still in their initial positions and the centering spring has expanded to store mechanical energy; and FIG. 5 shows a transverse section similar to the section of FIG. 2 in steady state operation of the motor (not shown) and impact start assist device wherein the sprags have moved to a position to lock the drive member to the driven member.

DETAILED DESCRIPTION OF THE DRAWINGS

An impact start assist arrangement according to the present invention is shown generally in FIG. 1 at 10. Illustratively, impact start assist arrangement 10 comprises, in combination, an electric motor 12 and a coupling device 14 which are connected to a load 16, as shown schematically in FIG. 1 Alternatively, the impact start assist of the present invention could be integrated into motor 12. More specifically, motor 12 may be provided with a rotor which incorporates the principles of the impact start assist arrangement of the present invention, as described more fully below. The invention may also be adapted to fit a particular load as an extension of the load or integral therewith.

With reference to FIG. 2, coupling device 14 includes drive member 18 which is rigidly coupled to the output of motor 12 and rotatably coupled to 20. Driven member 20 is rigidly coupled to load 16. Drive member 18 is formed to include an annular ring 22 which is generally concentric with and surrounds driven member 20. Annular ring 22 has an outer surface 24 and an inner surface 26 coaxially arranged around driven member 20. Diametrically opposed, inwardly facing, generally rectangular notches 28 are formed in inner surface 26 of annular ring 22 of drive member 18. Notches 28 are defined by leading surfaces 30, trailing or hammer surfaces 32, and connecting surfaces 34 disposed between leading surfaces 30 and hammer surfaces 32. Leading surfaces 30 are tapered to provide an area of decreasing notch width as radial distance increases, as will be more fully described below.

Driven member 20 is formed to include diametrically opposed, outwardly projecting ears 35 extending radially from surface 36 of driven member 20. Ears 35, defined by leading surfaces 38 and trailing or anvil surfaces 40 with distal surfaces 42 extending therebetween, extend into notches 28 formed in drive member 18. U-shaped, sprag-receiving recesses 44 are formed in outer surface 36 of driven member 20 adjacent leading surfaces 38 of ears 35. Cylindrical sprags 46, as illustratively shown in FIG. 2 and FIG. 3 are sized to removably fit in recesses 44. Centrifugal control spring 48 extends perimetrally around driven member 20 and is coupled to sprags 46. Centrifugal control spring 48 is preloaded to hold sprags 46 inside U-shaped sprag recesses 44 when driven member 20 is at rest or rotating at low rotational speeds, as described below.

Notches 28 are larger than ears 35 to provide for spaces 50 in notches 28 to allow ears 35 to freely travel relative to notches 28. Hammer surfaces 32 of notches 28 and anvil surfaces 40 of ears 35 are designed for flush engagement to provide for maximum impact surface between drive member 18 and driven member 20. Inasmuch as drive member 18 and drive member 20 are rigid, non-yielding elements, the flush engagement of the surfaces of these members is inelastic, that is, in a non-yielding or non-compressable state of engagement. Ear leading surfaces 38 and notch leading surfaces 30, rather than providing for flush engagement, are relatively positioned at a predetermined angle 52 to provide a taper to spaces 51, as shown in FIG. 4. Ears 35, notches 28 a spaces 50 cooperate to define sprag received spaces 51 after drive member 18 rotates through a portion of a revolution which is substantially equivalent to the width of space 50 as generally indicated by double-headed arrows 53 in FIG. 2.

Parking spring 54 is attached to driven member 20 and drive member 18. Parking spring 54 is generally circular, illustratively extending around load shaft 66 and having first and second radially extending arms 68 and 70, respectively. First arm 68 is attached to driven member 20 by driven member centering spring retainer 72. Second arm 70 is attached to drive member 18 by drive member centering spring retainer 74.

Sprags 46, as illustratively shown in FIG. 3, are disposed within sprag recesses 44. When motor 12 is deenergized and fully stopped, as shown illustratively in FIG. 2, sprags 46 are held in sprag recesses 44 by centrifugal control spring 48. Parking spring 54 is preloaded to hold leading surfaces 38 of ears 35 against leading surfaces 30 of notches 28, thereby providing spaces 50 between hammer surfaces 32 and anvil surfaces 40.

When motor 12 is energized, drive member 18 is rotated by motor 12 in the direction of arrow 76 and is decoupled from any load, while driven member 20 remains stationary due to the inertia and friction of the load. The resulting relative motion between drive member 18 and driven member 20 stores mechanical energy in parking spring 54. Being free of the load, drive member 18 can accelerate rapidly, thereby quickly building angular momentum. After a portion of a revolution, which is determined by the size of spaces 50, hammer surfaces 32 travel the distance to anvil surfaces 40 and impact anvil surfaces 40, as illustratively shown in FIG. 4. The impact instantaneously transfers angular momentum from drive member 18 to driven member 20. Providing a substantially instantaneous transfer of momentum by impact utilizes the relatively high running or load torque of the uncoupled driving member 18 to provide improved starting torque to an otherwise low starting torque motor. Furthermore, the impact start assist of the present invention accomplishes the improved start assist without dragging springs and thereby provides effectively increased starting torque without the energy losses due to dragging springs. (A relatively low amount of torque is absorbed by the parking spring 54.)

As driven member 20 comes up to speed under the urging of drive member 18, centrifugal force acts on sprags 46. When the centrifugal force is sufficient to overcome the opposing force of centrifugal control spring 48, sprags 46 move out of recesses 44 and into sprag receiving cavities 51, as shown illustratively in FIG. 5. Movement of sprags 46 from recesses 44 to the sprag receiving cavities 51 stores mechanical energy in centrifugal control spring 48. Sprags 46 move into the sprag receiving cavities 51 and lock drive member 18 to the driven member 20 and provides a mechanism for removing room available inside notches 28 for movement of ears 35. In this manner, sprags 46 advantageously eliminate relative movement between drive member 18 and driven member 20 which could cause unwanted vibrations or knocking between the members.

When motor 12 is initially deenergized, drive member 18 freewheels while the load on driven member 20 slows down driven member 20. As the speed of rotation of driven member 20 decreases, hammer surfaces 32 are generally maintained in contact with anvil surfaces 40. At the same time, the stored mechanical energy in centrifugal control spring 48 begins to overcome the centrifugal force acting to hold sprags 46 in place between drive member 18 and driven member 20. Eventually, the stored mechanical energy becomes sufficient to return sprags 46 to sprag recesses 44, thus removing the positive "lock" between the members. As drive member 18 and driven member 20 continue to slow down, the stored mechanical energy in parking spring 54 becomes sufficient to return notches 28 and ears 35 to their original pre-start positions as shown in FIG. 2. This arrangement assures that spaces 50 are fully available to allow drive member 18 to acquire the desired angular momentum prior to engaging driven member 20 on the next start cycle.

As previously noted, an impact start assist arrangement according to the present invention can be integrally constructed as part of an electric motor. Specifically, a rotor of an electric motor may be constructed from two components (a driven and a drive component) which are designed to provide the desired impact start assist, as described. Alternatively, a coupling device of the type generally described above and illustrated in FIGS. 2-5 may be integrally constructed within a motor housing.

Although the invention has been described in detail with reference to certain preferred embodiments, variations and modifications exist within the scope and spirit of the invention as described and defined in the following claims.

We claim:

1. An impact start assist device for an electric motor, the impact start assist device comprising
   a driven member rigidly coupled to a load,
   a driven member rigidly coupled to the motor for transferring motor torque to the driven member, said drive member and said driven member being rotatable relative to one another through at least a portion of a revolution and being inelastically engageable thereafter, and
   first means for providing a substantially instantaneous transfer of angular momentum from the drive member to the driven member upon engagement.

2. The impact device of claim 1, further comprising second means for rotatably locking the driven member and drive member together at high rotational speed and for unlocking the driven member from the drive member at low rotational speeds.

3. The impact device of claim 1, wherein the first means includes at least one anvil surface formed on the driven member and at least one hammer surface formed on the drive member, the hammer surface being positioned to impact the anvil surface formed on the driven member after the drive member has rotated through at least a portion of a revolution relative to the driven member.

4. The impact device of claim 2, wherein the second means includes at least one sprag that moves from a rest position to a wedged position between the driven member when the drive and driven members exceed a first predetermined rotational speed.

5. The impact device of claim 4, wherein the second means further includes resilient means coupled to the sprag for moving the sprag from the wedged position to the rest position when the drive and driven members slow to less than a second predetermined rotational speed.

6. The impact device of claim 1, further comprising means for returning the drive member and driven member to predetermined angular positions relative to each other when the drive and driven members slow to less than a third predetermined rotational speed.

7. The impact device of claim 6, wherein the means for returning comprises a second resilient element coupled to the drive member and the driven member.

8. A rotor for an electric motor which has a stator and in which an electric current is applied to the stator to cause the rotor to rotate, the rotor comprising
   a first rotor component for driving a load,
   a second rotor component which rotates when current is applied to the stator and which is rotatable relative to the first component through at least a portion of a revolution and which is inelastically and rotatably coupled to the first rotor component after rotation through said portion of a revolution, and
   first means for providing a substantially instantaneous transfer of angular momentum from the second rotor component to the first rotor component.

9. The improved rotor of claim 8, further comprising second means for resiliently returning the first rotor component and the second rotor component to predetermined angular positions relative to each other when the rotor is at rest.

10. The improved rotor of claim 8, wherein the first means includes at least one anvil sur TM face formed on the first rotor component and at least one hammer surface formed on the second rotor component and positioned to impact the anvil surface formed on the first rotor component after the second rotor component rotates through said portion of said revolution relative to the first rotor component.

11. The improved rotor of claim 8, further comprising third means for locking the first and second rotor components together at relatively high rotational speeds and for unlocking the first and second rotor components from each other at relatively low rotational speeds.

12. The improved rotor of claim 11, wherein the third means includes at least one sprag that moves from a rest position to a wedged position between the at least one hammer surface and the at least one anvil surface at relatively high rotational speeds.

13. The improved rotor of claim 12, wherein the third means further includes a resilient element coupled to the sprag to move the sprag from the wedged position to the rest position at relatively low rotational speed to unlock the first and second rotor components.

14. An impact start assist device comprising
a driven member formed to include at least one anvil surface,
a drive member which is rotatably relative to the driven member through at least a portion of a revolution, and rotatably coupled to the driven member after said portion of said revolution and formed to include at least one hammer surface positioned to engage the at least one anvil surface,
first means for locking the driven member and drive member together at high rotational speed wherein the first means includes at least one sprag that moves from a rest position to a wedged position between the at least one hammer surface and the at least one anvil surface at high rotational speed,
second means for unlocking the driven member and drive member from each other at low rotational speed wherein the second means includes a first resilient element coupled to the at least one sprag to move the at least one sprag from the wedged position to the rest position at low rotational speed, and
a second resilient element coupled to the drive member and the driven member for returning the drive member and driven member to predetermined angular positions relative to each other at low rotational speed.

15. The impact device of claim 14, wherein the driven member is coupled to a load.

16. The impact device of claim 14, wherein the drive member is coupled to a motor.

17. An electric motor comprising a stator and a two-component rotor, said two-component rotor comprising a first component for driving a load and a second component which rotates when current is applied to the stator and which is rotatable relative to the first component through at least a portion of a revolution, means for providing a substantially instantaneous transfer of angular momentum from the second component to the first component, and means for rotatably locking the first component to the second component.

18. An electric motor according to claim 17, wherein at least one of said first and second components has at least one anvil surface formed thereon, and wherein said other component has at least one hammer surface formed thereon, and wherein the hammer surface impacts the anvil surface to effect said substantially instantaneous transfer of angular momentum from the second component to the first component.

19. An electric motor according to claim 17, further comprising means for positioning the first and second components at a predetermined relative angular orientation when the rotor is at rest.

20. An electric motor according to claim 19, wherein said positioning means comprises a spring having a first end attached to the first component and a second end attached to the second component.

21. An impact start assist device for an electric motor, the impact start assist device comprising
a driven member coupled to a load,
a drive member coupled to the motor and to the driven member for transferring motor torque to the driven member, said drive member and said driven member being rotatable relative to one another.
means for providing a substantially instantaneous transfer of angular momentum from the drive member to the driven member, and
means for rotatably locking the driven member and drive member together at high rotational speed and for unlocking the driven member from the drive member at a low rotational speeds.

22. The impact device of claim 21, wherein the locking means includes at least one sprag that moves from a rest position to a wedged position between the driven member when the drive and driven members exceed a first predetermined rotational speed.

23. The impact device of claim 22, wherein the locking means further includes resilient means coupled to the sprag for moving the sprag from the wedged position to the rest position when the drive and driven members slow to less than a second predetermined rotational speed.

24. A rotor for an electric motor which has a stator and in which an electric current is applied to the stator to cause the rotor to rotate, the rotor comprising:
a first rotor component for driving a load,
a second rotor component which rotates when current is applied to the stator and which is rotatable relative to the first component through at least a portion of a revolution and which is rotatably coupled to the first rotor component after rotation through said portion of a revolution,
means for providing a substantially instantaneous transfer of angular momentum from the second rotor component to the first rotor component, and
means for locking the first and second rotor components together at relatively high rotational speeds and for unlocking the first and second rotor components from each other at relatively low rotational speeds.

25. The rotor of claim 24, wherein the locking means includes at last one sprag that moves from a rest position to a wedged position between the at least one hammer surface and the at least one anvil surface at relatively high rotational speeds.

26. The rotor of claim 25, wherein the locking means further includes a resilient element coupled to the sprag to move the sprag from the wedged position to the rest position at relatively low rotational speed to unlock the first and second rotor components.

* * * * *